Figure 1:
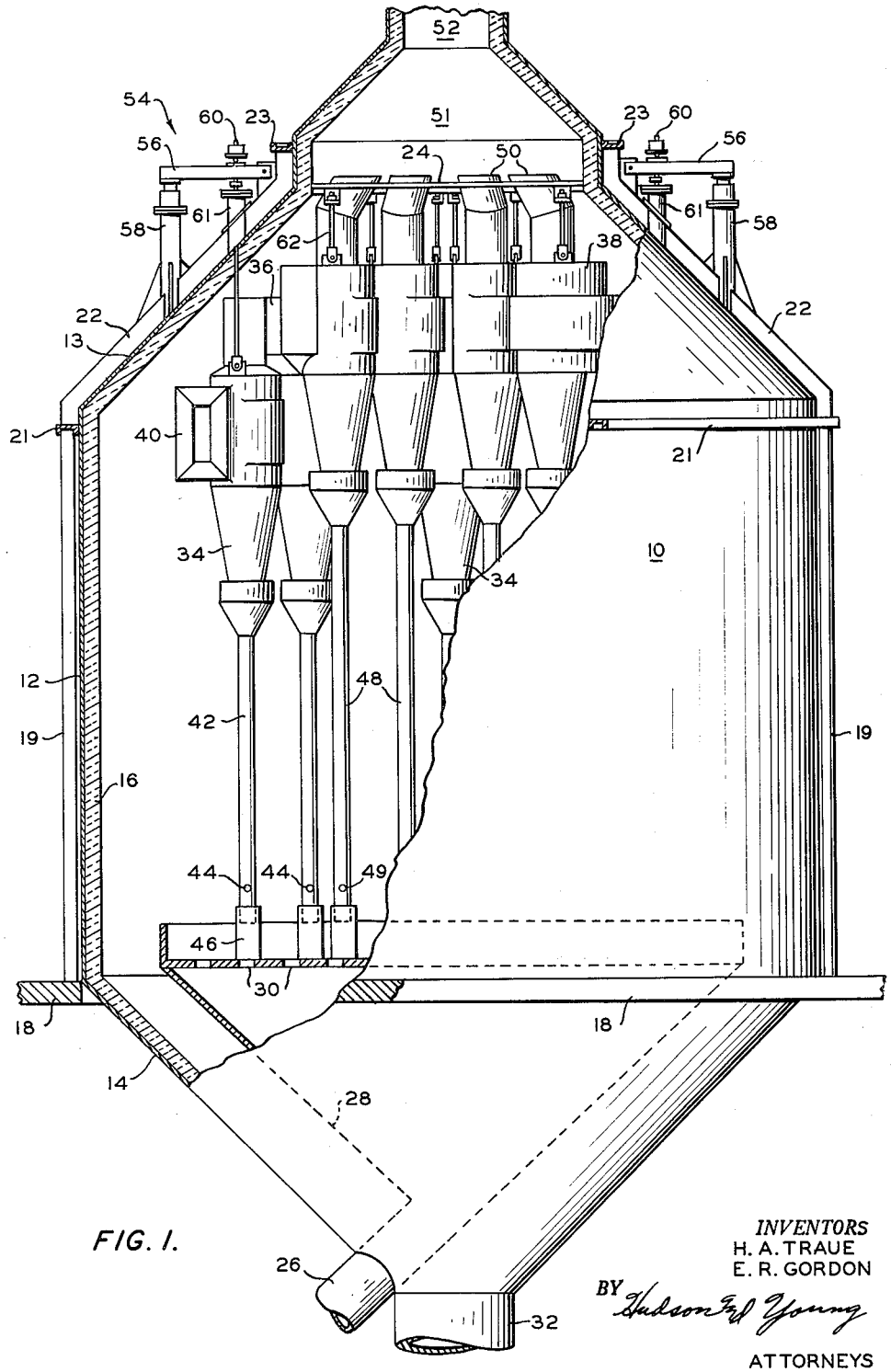

INVENTORS
H. A. TRAUE
E. R. GORDON
ATTORNEYS

May 23, 1961 H. A. TRAUE ET AL 2,985,516
FLOATING SUPPORT ASSEMBLY
Filed May 17, 1956 4 Sheets-Sheet 2

INVENTORS
H. A. TRAUE
E. R. GORDON
BY *Hudson & Young*
ATTORNEYS

United States Patent Office 2,985,516
Patented May 23, 1961

2,985,516

FLOATING SUPPORT ASSEMBLY

Henry A. Traue, Bartlesville, Okla., and E Reed Gordon, Sweeny, Tex., assignors to Phillips Petroleum Company, a corporation of Delaware Filed May 17, 1956, Ser. No. 585,525

11 Claims. (Cl. 23—288)

This invention relates to improved support means for non-rotatable loads movable vertically within narrow limits. A specific aspect of the invention is concerned with external support means for a load suspended within a vessel or chamber.

One application of the apparatus of the invention is in supporting first and second stage cyclone separators in a fluid catalytic cracking reactor or regenerator wherein support of rigidly connected cyclone separators at different levels by support rods of different lengths is required. In an apparatus of this type, a fluidized particulate solid is maintained in the lower section of the reactor and/or regenerator in dense phase and a dilute phase of the particles in suspending or fluidizing gas is maintained in an upper section of the vessel. The cyclones are conventionally arranged in pairs, the first stage separator being disposed at a lower level than the second stage separator and rigidly attached thereto with a communicating conduit from the upper section of the lower separator to the inlet of the upper separator. The dip legs or downcomer conduits from the bottom of the two separators extend downwardly into the dense phase of the particulate solid in the lower section of the vessel where they usually form a slidable joint with a fixed conduit or aligning element thereby permitting vertical movement of the dip legs or downcomers without permitting lateral movement thereof. In a currently used construction in a fluid catalytic cracking regenerator of this type each pair of first and second stage cyclones is suspended by two support rods from the dome of the vessel, one rod being attached to each cyclone. Due to the difference in length of the support rods unequal expansion takes place upon heating and cooling over a wide temperature range and it has been found that this has resulted in the breakage of one of the structural supports of the dome to which the supporting rods are attached, or breakage of the lugs on the separators to which the rods are attached.

Our invention overcomes or compensates for the unequal expansion or lengthening of the support rods under varying high temperature conditions which prevail in fluid catalytic reactors and/or regenerators.

Hence, the principal object of the invention is to provide an improved support structure for solid-gas separators in a catalytic cracking and/or regenerating unit. Another object is to provide an improved load-supporting assembly. Another object is to provide in a vessel an improved external load supporting assembly for supporting an internal load. It is also an object of the invention to provide load-supporting means for supporting a non-rotatable load on a sloping structure from spaced-apart points on the load. A further object is to provide load supporting structure for a non-rotatable load which is supported by rods in different lengths subjected to varying high temperatures. Other objects of the invention will become apparent on consideration of the accompanying disclosure.

The invention comprises a novel rotatable support beam pivoted at one section to a fixed support and spring-supported at another section of the beam with a load supporting rod pivotally connected to the beam. The support assembly is particularly adapted for supporting a load from a sloping structure such as the sloping roof or dome of a catalytic reactor. In an assembly for this purpose, the beam is pivotally attached to the dome structure and extends laterally and radially therefrom to a spring support adjacent the outer end, the spring being supported in an upright column resting on the dome structure. The support rod is pivotally attached to the support beam intermediate the ends thereof and between the supported section, preferably closer to the point at which the beam is pivoted so as to decrease the weight on the spring. The support rod is attached at the lower end to a first stage separator which in turn is rigidly fixed to a higher level second stage separator. The second stage separator is suspended on a second support rod depending from the dome of the reactor and, more specifically, from a tube sheet closing off the upper section of the dome. In this manner the rigidly attached first and second stage separators are suspended in pairs from the dome structure and are nonrotatable because of the downcomers or conduits depending from the bottom of the separators and extending into fixed conduits in slidable engagement therewith. The invention provides for limited vertical movement of the support rod which depends from the spring-supported rotatable beam so as to compensate for unequal expansion of the two support rods and distribute the load of the two separators more nearly uniformly on the two support rods than is the case with conventional supports for this type of structure.

Figure 2:
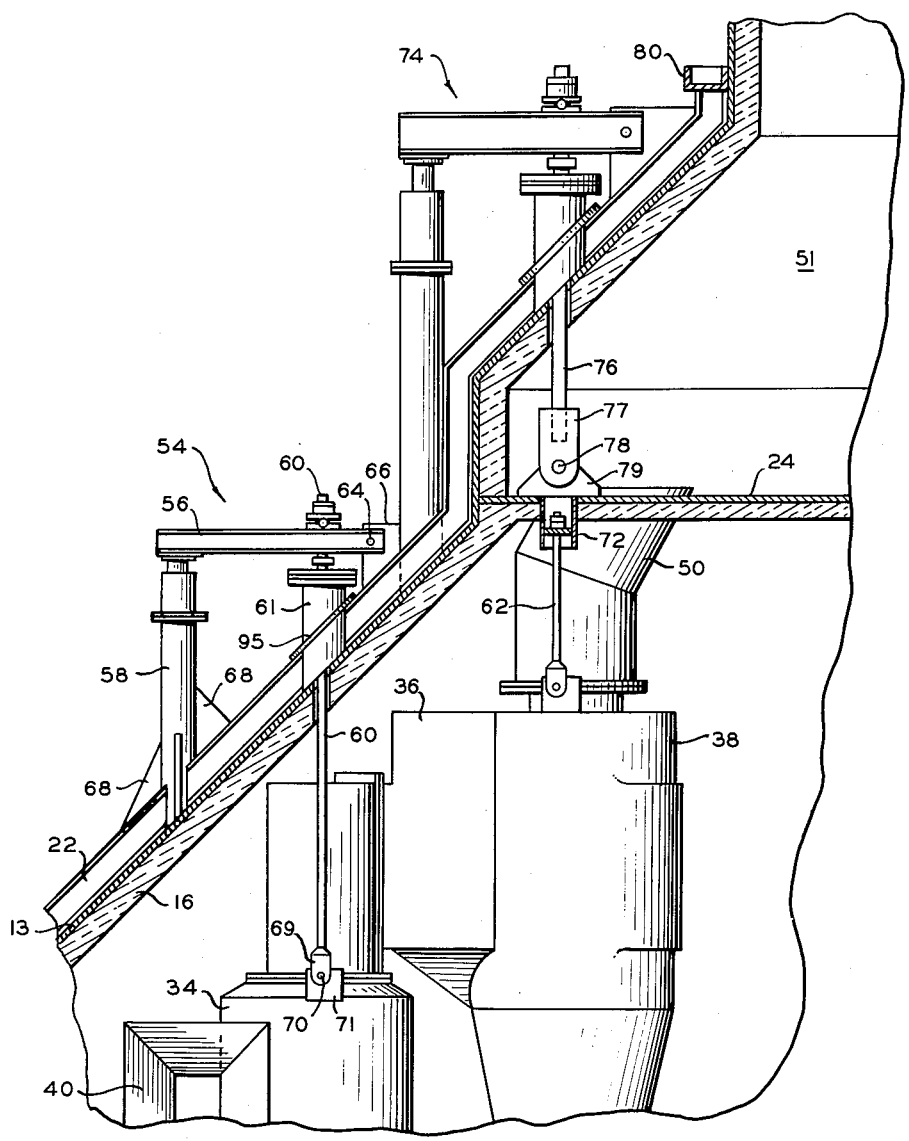
Figure 3:
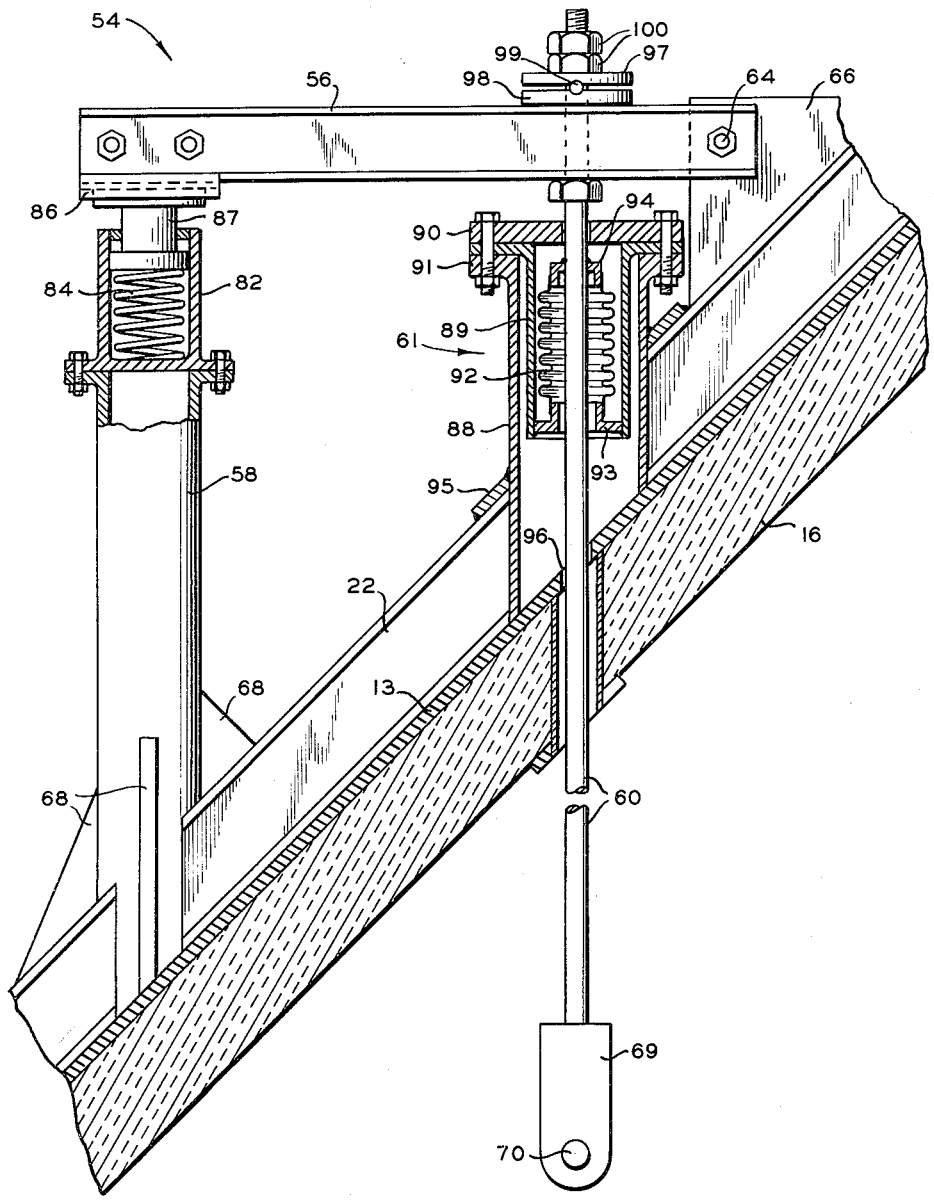
Figure 4:
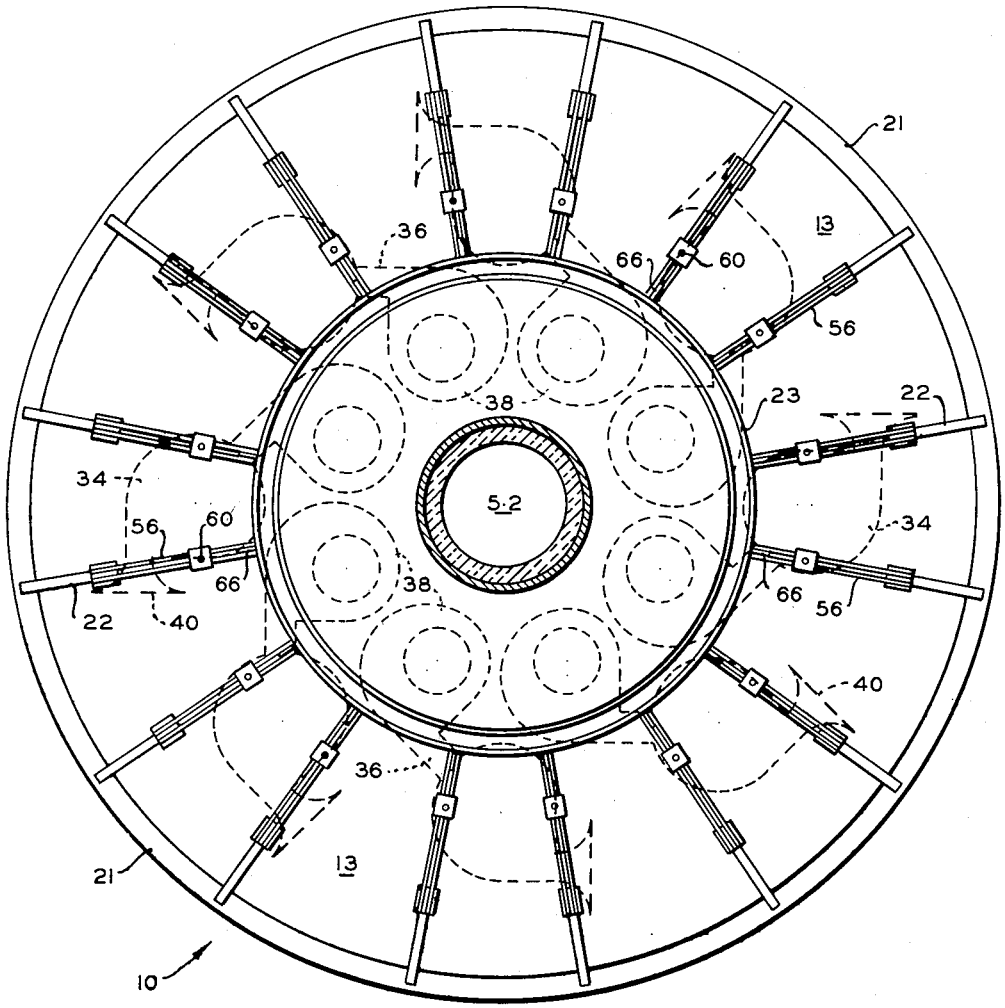

A more complete understanding of the invention may be had by reference to the accompanying schematic drawing of which Figure 1 is a partial sectional elevation of a catalytic regenerator in which the first and second stage separators are supported in accordance with the invention; Figure 2 is a partial section of a preferred embodiment of supporting structure for the cyclones of Figure 1; Figure 3 is a detailed partial section of the support assembly for the first stage separators of Figures 1 and 2; and Figure 4 is a plan view in partial section of the regenerator of Figure 1 showing the arrangement of the first and second stage separators. Corresponding parts in the various figures are similarly designated.

Referring to Figure 1, a catalytic regenerator 10 comprising a cylindrical shell 12, having a generally conical dome 13 and a conical bottom 14, is lined with an insulating material 16. The regenerator 10 is supported on a structural steel base 18. Auxiliary supporting structure includes vertical support ribs 19 which rest on base 18, annular channel iron 21 extending completely around the regenerator, sloping ribs 22, and annular channel iron 23. A tube sheet or transverse partition 24 closes off the upper section of the dome. An inlet conduit 26 for introducing solid catalyst particles in dilute phase in an entraining regeneration gas connects with a funnel member 28 which is provided with a perforate grid 30 thru which catalyst particles are carried into the main section of the regenerator above. Outlet 32 carries regenerated catalyst particles to a fluidized catalyst reactor similar in construction to regenerator 10. A plurality of circularly arranged first stage cyclone separators 34 are connected by conduits 36 with a series of second stage cyclone separators 38 in pairs, the second stage separators being circularly disposed radially inside of the first stage separator and at a substantially higher level. Separators 34 have gas-solid inlets 40 for introducing the dilute gas-solid phase from which a greater portion of the solids are separated and are delivered through dip legs 42 and openings 44 to be the bed of catalyst in the chamber. Dip legs 42 extend into conduits 46 which they slidably engage to accommodate lowering and raising of the separator upon expansion and contraction of the support rods and the entire separator assembly.

After first stage separation is effected in separators 34, the effluent gas containing residual catalyst particles passes to the second stage separators via conduits 36 and the remaining entrained particles are separated and delivered directly to dip legs 48 and outlets 49 into the catalyst bed. The effluent denuded gas passes from the second stage cyclones 38 via conduits 50 into chamber 51 which leads into stack 52. Conduits 50 are sealed with tube sheet 24 so as to prevent passage of gas and solids from the interior of regenerator 10 directly into chamber 51 and to the stack 52.

Support assembly 54 is provided for supporting first stage separators 34. This assembly comprises a support beam 56 pivotally attached to the support framework on dome 13 (shown in more detail in Figures 2 and 3), a spring support 58, and a support rod 60 attached to beam 56 and to separator 34. Support rod 60 passes through sealing assembly 61 more fully shown and described in connection with Figure 3. The second stage separators 38 are supported from tube sheet 24 by rods 62. The positioning of the spring remote from the shell of the regenerator is particularly advantageous in avoiding overheating and softening of the spring so that its service life is thereby increased.

Referring to Figure 2, support beam 56 is pivoted at 64 on hanger 66 which is welded or otherwise rigidly attached directly to I-beam 22. Support column 58 containing the spring support for support beam 56 is rigidly attached to I-beam 22 and to shell 13 by means of plates 68 by suitable welds or other fastenings. Support rods 60 are provided with couplings 69 which attach by means of pins 70 to hangers 71 on separators 34. Separators 38 are similarly suspended or attached to rods 62. Rods 62 pass through and are suspended from hangers 72 which are in turn rigidly attached to tube sheet 24. In the embodiment shown in this figure, tube sheet 24 is provided with additional support from the dome of the regenerator by means of a support assembly 74 which is similar in construction to support assembly 54. In this assembly, support rods 76 are attached by means of couplers 77 and pins 78 to brackets 79 which are welded or riveted to tube sheet 24 to place rods 62 and 76 in substantially axial alignment. It has been found that, where the support structure of the second stage separators of Figure 1 is subjected to extremely high temperatures, tube sheet 24 is weakened to such an extent that the weight of the second stage separators distorts the tube sheet. However, the structure shown in Figure 1 is entirely adequate and entirely satisfactory where the vessel shown is utilized as a catalytic reactor in which temperatures do not reach the same high elevation as they do in regeneration of catalytic material by burning off the carbon deposit on the particles. Hence, where the apparatus is to be subjected to temperatures of 1000° F. and higher the structure shown in Figure 2 is extremely effective in supporting the tube sheet 24 and support structure for the second stage separators without inducing warpage or distortion of tube sheet 24, and, in combination with support assembly 54, provides highly satisfactory support means for the pairs of separators. The I-beam support construction shown in Figure 1 is continued up the dome to annular channel iron 80 in order to provide support assembly 74 similar to that of assembly 54.

Referring to Figure 3, support assembly 54 includes a spring housing 82 seated to support column 58 and enclosing a compression spring 84. Beam 56 is supported on the outer end directly on a grooved cap 86 which is attached directly to guide 87. Guide 87 slidably engages the inner wall of housing 82 and acts directly on spring 84 so as to effect the raising and lowering of the outer end of beam 56 when the tension on support rod 60 is changed by lengthening or shortening thereof.

The sealing assembly 61 around support rod 60 adjacent shell 13 comprises an outer housing 88 welded or otherwise sealed to shell 13 at its lower end. Inner flanged housing 89 is supported, along with cap 90, on the flanged end 91 of housing 88. Positioned within inner housing 89 is a bellows 92 which is sealed to closure member 93 which in turn is welded to housing 89 to provide a seal at the lower end of the bellows. The upper end of the bellows is sealed to cap 94 which in turn is welded to rod 60 to form a seal therewith. The structure shown seals off the escape of pressure and gas through opening 96 in shell 13 through which rod 60 passes. An elliptical reinforcing plate 95 is welded to I-beam 22 and to housing 88. Support rod 60 extends upwardly through support beam 56 and is pivotally mounted thereon by means of support plates 97 and 98 between which is positioned pin 99 (each side of rod 60) which is welded to the lower plate and journalled in plate 97. A pair of nuts 100 provine adjusting locking the position of the rod.

Figure 4 shows the relative positioning of the first and second stage cyclones 34 and 38 respectively as well as ribs 22 and support assembly 54 positioned on the outside of the dome. It will be noted that beam 56 of assembly 54 comprises a pair of channel irons bolted together in spaced apart relation to form a built-up beam and providing intermediate space for rod 60 and hanger 66. A beam of box or other suitable construction can also be utilized as support beam 56.

While the detailed description of the invention pertains to support means for separators in a reactor or regenerator, the invention is not limited to this particular application but, on the contrary, is applicable to the support of other types of loads, particularly where they are to be supported from a sloping support wall and where exterior support for an interior load is advantageous.

Certain modifications of the invention will become apparent to those skilled in the art and the illustrative details disclosed are not to be construed as imposing unnecessary limitations on the invention.

We claim:

1. A support assembly for supporting a load below a lateral wall of a fluid catalytic reactor comprising a support beam attached at one end to a fixed pivot on top of said wall, the other end of said beam being supported by a compression spring supported on said wall; a support rod pivotally suspended from an intermediate section of said beam and extending downwardly thru said wall free to move therethru for supporting a load on said rod below said wall within said reactor; and a housing around said support rod forming a seal therewith and with said wall.

2. The support assembly of claim 1 wherein said wall is sloping, said beam is generally horizontal, said pivot is attached to a high point on said wall, and said compression spring is supported on an upright post on said wall.

3. The support means of claim 1 including sealing assembly between said wall and said rod which permits vertical movement of said rod in said wall.

4. The support means of claim 3 wherein said sealing assembly comprises a housing around a portion of said rod adjacent said wall sealed with said wall; a bellows within said housing enclosing a portion of said rod sealed to said rod at one end and to said housing at the other end.

5. A support assembly for supporting a load below a sloping roof on a reaction vessel subject to substantial temperature changes comprising a generally horizontal support beam attached at one end to a fixed pivot on said roof and extending away from said roof; an upright post on said roof under the opposite end of said beam; a compression spring between said post and said beam flexibly supporting said opposite end; a support rod pivotally suspended from an intermediate section of said beam and extending vertically thru said roof free to move vertically in relation thereto; sealing means between said rod and said roof comprising a housing around a portion of said rod adjacent said wall sealed therewith and a bellows within said housing enclosing a portion of said rod, said bellows being sealed to said rod at one end and to said housing at the other end; and a load on said rod below said roof within said vessel.

6. The support assembly of claim 5 wherein said load comprises a cyclone separator and said vessel is a fluid catalytic reactor.

7. Apparatus for effecting contacting operations between a hot gas and fluidized solids and separation of solids from the gases suspending and entraining same, which comprises in combination a closed cylindrical contacting vessel having a sloping roof; a transverse partition closing off an upper portion of the area under said roof; a series of first stage cyclone separators disposed circularly within said vessel radially outside of said partition; a corresponding series of second stage cyclone separators disposed in a circular pattern radially inside of first said series and at a higher level with the inlet of each connecting with the gas outlet of the corresponding first stage separator; a conduit from the gas outlet of each second stage separator opening into said upper portion thru said partition in seal relation therewith; a support assembly for each first stage separator comprising a radial support beam pivotally attached at the inside end to said roof and spring-supported at the opposite end in an upwardly-extending support column from said roof, and a support rod pivotally depending from an intermediate section of said beam, passing thru said roof in movable sealed relation thereto and pivotally attached at its lower end to said first stage separator; and support means for each second stage separator comprising a support rod depending from said transverse partition.

8. The apparatus of claim 7 wherein each said support rod for the first stage separators is sealed with said roof by sealing means comprising a housing enclosing a section of said rod adjacent said roof sealed thereto; a bellows within said housing enclosing a section of said rod and sealed thereto at one end and to said housing at the other end.

9. The apparatus of claim 7 wherein said transverse partition is supported from the roof above by pivotally attached rods in a support assembly arranged in the manner of the support assembly for said first stage separators, the support rods thereof being substantially in axial alignment with the support rods depending from said partition.

10. The apparatus of claim 9 wherein each support rod passing thru said roof is sealed therewith by means comprising a housing enclosing a section of said rod adjacent said roof sealed thereto; a bellows within said housing enclosing a section of said rod, sealed thereto at one end and to said housing at the other end.

11. The apparatus of claim 7 wherein said radial support beam comprises a pair of spaced-apart parallel bars attached to each other thru spacers to provide an intermediate space for said support rod and for a hanger at the pivoted end.

References Cited in the file of this patent

UNITED STATES PATENTS

| | | |
|---|---|---|
| 898,807 | Wayrynen | Sept. 15, 1908 |
| 2,544,768 | Schulder | Mar. 13, 1951 |
| 2,645,566 | Stookey | July 14, 1953 |
| 2,651,482 | O'Conor | Sept. 8, 1953 |
| 2,698,224 | Brooke | Dec. 28, 1954 |
| 2,728,642 | Cunningham et al. | Dec. 27, 1955 |
| 2,734,707 | Douglas | Feb. 14, 1956 |

OTHER REFERENCES

Smith: "Elements of Physics," 5th Edition, 1948, McGraw-Hill Book Co., pages 57 and 58.